United States Patent [19]

Keldmann

[11] 4,391,913

[45] Jul. 5, 1983

[54] TEMPERATURE REGULATING SYSTEM FOR THE CONTROL OF TEMPERATURE IN A ROOM

[75] Inventor: Erik C. V. Keldmann, Bellinge, Denmark

[73] Assignee: Elpan ApS, Odense, Denmark

[21] Appl. No.: 388,214

[22] Filed: Jun. 14, 1982

Related U.S. Application Data

[63] Continuation-in-part of Ser. No. 48,638, Jun. 14, 1979, abandoned.

[30] Foreign Application Priority Data

May 21, 1979 [DK] Denmark ............................ 2074/79

[51] Int. Cl.³ ......................... F28F 27/00; G01K 7/00
[52] U.S. Cl. ...................................... 236/36; 236/51; 374/126
[58] Field of Search ................. 236/94, 51, 68 R, 3, 236/37, 36; 237/73; 374/121, 126, 132, 183

[56] References Cited

U.S. PATENT DOCUMENTS

| | | | |
|---|---|---|---|
| 2,764,355 | 9/1956 | Machlet | 236/78 X |
| 2,835,779 | 5/1958 | Kazan | 236/91 R |
| 2,873,916 | 2/1959 | Le Hane et al. | 236/37 X |
| 3,062,941 | 11/1962 | White | 236/6 X |
| 3,159,212 | 12/1964 | Patrick | 165/26 |
| 3,246,838 | 4/1966 | Bauer | 236/36 |

Primary Examiner—William E. Wayner
Attorney, Agent, or Firm—Holman & Stern

[57] ABSTRACT

A temperature regulating system for a room comprising a feeler gauge (A) suspended from the ceiling and being capable of sensing the air and the radiation temperatures, the instantaneous values of which control a wireless transmitter built into the feeler gauge to trasmit signals to a regulator (B or C) for the radiators heating the room. The feeler gauge may be easily suspended in a position most advantageous for detecting the temperatures, and causing the least inconvenience to the furnishings in the room.

4 Claims, 5 Drawing Figures

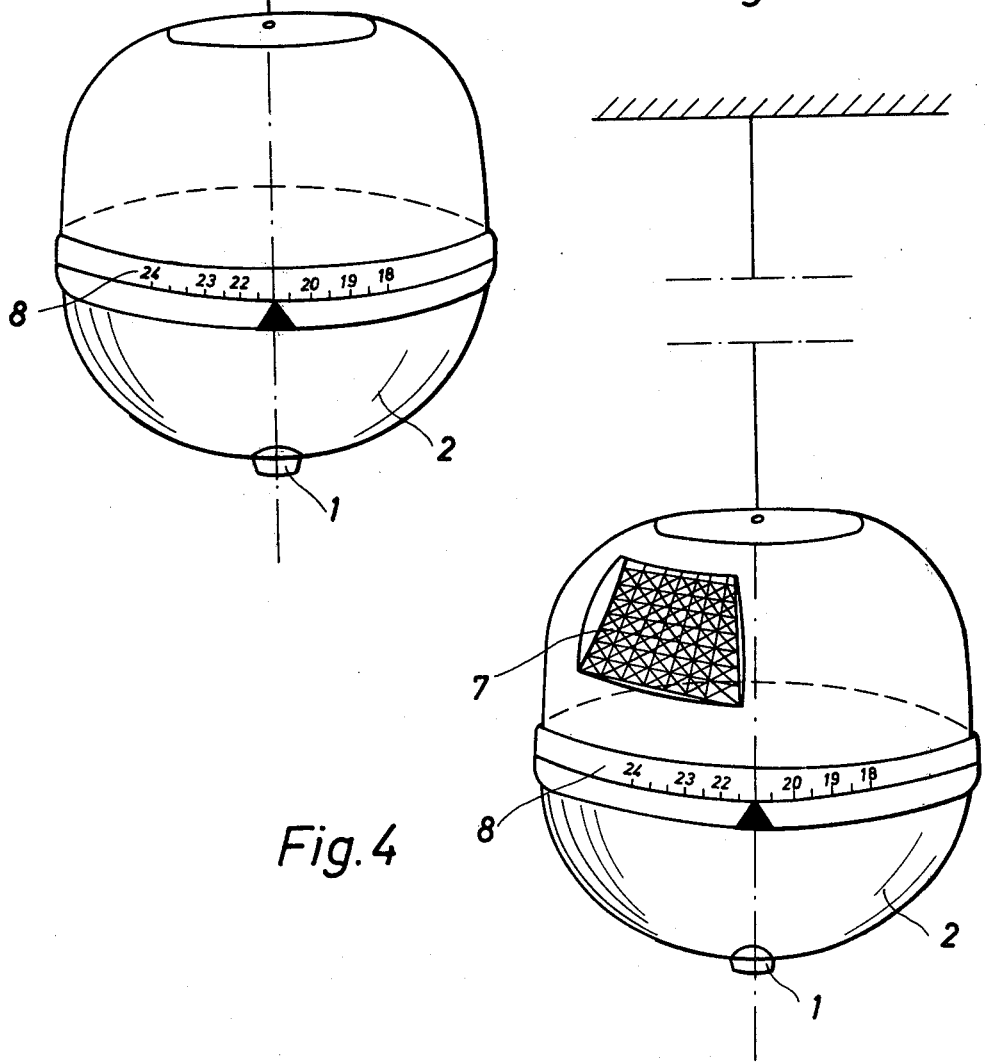
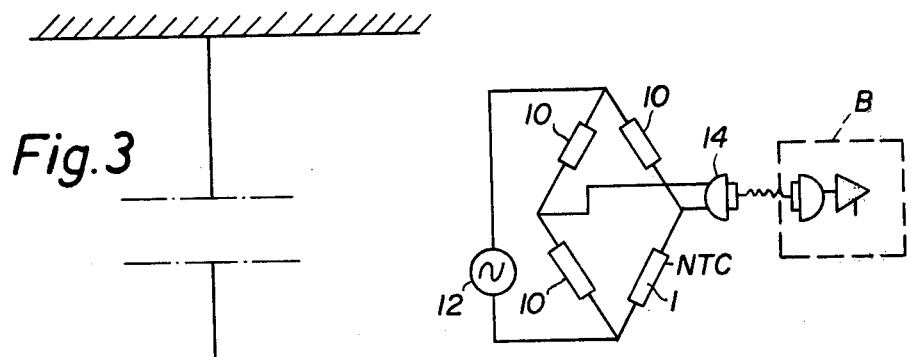

TEMPERATURE REGULATING SYSTEM FOR THE CONTROL OF TEMPERATURE IN A ROOM

This is a continuation-in-part application of U.S. Ser. No. 06/048,638, filed June 14, 1979, now abandoned.

BACKGROUND OF THE INVENTION

Field Of The Invention

The invention relates to a temperature regulating system for the control of the temperature in a room and comprises a feeler gauge adapted to remotely control the supply of energy to a radiator system in the room.

Usually feeler gauges which control regulating means so as to control the supply of energy to radiators in response to the room temperature are located on or relatively close to the radiator, whereby the emission of heat from the radiator is regulated in response to the temperature at such a specific spot in the room which is not representative of the conditions throughout most of the room. Even when the feeler gauge is not directly subjected to conduction or radiation from the radiator, these known temperature regulating systems do not provide a control of the emission of heat of the radiators in response to the so-called comfort temperature, i.e. the mean value of the air temperature and the average radiation temperature.

It is known to use sensors which are influenced both by air temperature in a room, which flows past the sensor by convection, and average radiation temperature, as shown in German Pat. No. 1921570. This device is used to control the comfort temperature.

BRIEF SUMMARY OF THE INVENTION

The object of the invention is to provide a temperature regulating system which permits an optimum utilization of energy and provides optimum comfort in a room by using a feeler gauge locatable at any desired and preferred spot in the room, and which is capable of controlling the regulating means for the radiators in response to the comfort temperature.

The feeler gauge according to the invention is characterized in that it is a combined radiation and convection gauge for sensing the so-called comfort temperature and transmitting a signal in response thereto at regular intervals to a receiver controlling the adjustment of a valve or contact means in turn regulating the supply of energy to the radiator system.

The feeler gauge emits the signals by wireless to the receiver controlling the regulating means of the radiator and accordingly may be located in the best possible location in the room, preferably suspended from the ceiling. Furthermore, since it senses both the room temperature and the radiation intensity from heat emitting bodies, its transmitter may emit signals directly representing changes in the comfort temperature and immediately influencing the regulating means of the radiator system in such a direction that they counteract changes in the comfort temperature.

The invention regulating system according to the invention is especially advantageous in connection with a radiator system wherein a plurality of radiators shaped as baseboards along substantially all the walls of the room. It has been found that such a radiator system permits a very uniform distribution of heat in the room with a difference in temperature between floor and ceiling of about $\frac{1}{4}°$ C., i.e. corresponding to a temperature gradient of about 0.2° C./m. In this manner good possibilities have been provided for locating the feeler gauge at any desired spot in the room.

A feeler gauge for the system according to the invention is shaped on its underside as a thin-walled hemisphere of good heat-conducting material with a black mat radiation absorbing surface being permanently in heat-conducting connection with a temperature dependent electronic component, the properties of which are changed in response to the temperature of the hemisphere and transmitted through the transmitter to the receivers, wherein the signal may compared with a "desired temperature" programmed by the receiver.

The radiation absorbing surface gauges the radiation from the entire room, and the feeler gauge senses the air temperature at the most advantageous measuring spot where the gauge is located. By using the aforesaid system of radiators in the form of baseboards the location of the feeler gauge in the room is relatively unimportant provided it is suspended at an appropriate height.

The transmitter according to the invention is preferably an ultrasonic transmitter, which eliminates the risk of persons or objects in the room shading the signals for the receiver. The transmitter may be constructed in many ways with predetermined electronic circuits utilizing electronic components known per se.

According to the invention, the transmitter may be actuated by a rechargeable battery or, if desired, be adapted to be actuated by a solar cell. The consumption of energy for driving the transmitter is small, inter alia, because the frequency of signals for regulating the temperature in a well insolated room may be rare.

The resulting efficient regulation of the temperature provides an essential reduction of energy consumption, which may be further reduced by providing the receiver with a clock timer for time adjustment of the comfort temperature, whereby the room has a certain maintained temperature for some periods and a lowered temperature for other periods, e.g. at night.

It is preferred that the receiver be built in a radiator and provided with a sliding potentiometer permitting direct adjustment of the desired comfort temperature.

According to the invention the feeler gauge may furthermore comprise a means for adjustment of the desired temperature, and the transmitter may be adapted to emit signals when the temperature sensed deviates from the desired temperature. As a result, a single adjustment of the feeler gauge is sufficient, even though its transmitter is adapted to influence several receivers on several radiators.

The receiver should be adapted to emit an alarm signal, preferably for lighting a lamp, when the signals from the transmitter fail to appear or are below a predetermined value.

BRIEF DESCRIPTION OF THE DRAWING

The invention will now be described below with reference to the accompanying drawing, in which FIGS. 2 to 4 illustrate alternative embodiments of the feeler gauge according to the invention, and FIG. 5 is a schematic illustration of an electrical circuit utilized in the invention.

DETAILED DESCRIPTION

Figure 1:
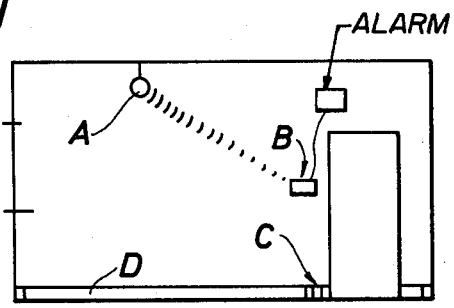
FIG. 1 is a schematic elevational view of a room provided with a combined feeler gauge and transmitter suspended from the ceiling and a receiver for regulating the heat to a system of panel radiators arranged in two different positions.

FIG. 1 is a diagrammatical view of a room, the comfort temperature of which is registered and adjusted by means of the temperature regulating system according to the invention. A feeler gauge A suspended from the ceiling is provided with a radiation-absorbing surface and a feeler gauging the air temperature. The instantaneous values thus measured conrol a transmitter located in the feeler gauge. This transmitter emits with a predetermined, relatively rare signal frequency, signals to a receiver B located on the wall of the room and adapted to control the adjustment of the regulating means regulating the supply of energy to a radiator system in the form of baseboards D. These baseboards extend substantially along all the outer walls of the room. These baseboard radiators may be either electrical radiators, the current supply of which is regulated by switch means receiving pulses from the receiver B, or they may be water or steam radiators, whereby the receiver B emits pulses to valve means regulating the passage of the heat-emitting medium.

An alternative embodiment is also indicated in FIG. 1, whereby a receiver C is located on the panel radiator D.

The transmitter in the feeler gauge A may be constructed with printed electronic circuits and is preferably an ultrasonic transmitter, whereby it is possible to avoid noise problems which may interfere with other electronic equipment. At the same time the risk of persons or objects in the room interrupting the connection to the receiver is avoided. Other types of transmitters are, however, possible, e.g. an infrared radiation transmitter with an appropriate shielding or a VHF-transmitter or a UHF-transmitter.

The receiver B or C, respectively, may also be constructed in various ways and comprise adjustment means permitting adjustment of the comfort temperature from 0° to 30° C. Furthermore, it is preferred that it can be programmed so as to time adjust the comfort temperature, thus providing the possibility of a desired maintained temperature in the room for some periods such as when in use and a lowered temperature for other periods such as at night. Moreover, the receiver may be provided with an alarm system for emitting a signal, e.g. which lights a lamp, when the signals from the transmitter are weak or insufficient and the transmitter requires recharging, which may sometimes be the case when the transmitter in the feeler gauge A is energized by a battery. The feeler gauge A may for this purpose be suspended in such a manner that it has easy access.

The indicated variant C of the receiver is built directly in the panel radiator and may be provided with a sliding potentiometer permitting direct adjustment of the comfort temperature from 0° to 30° C.

The output function of the receiver B or C respectively is a relay function, preferably 10A/250 VAC.

Figure 2:
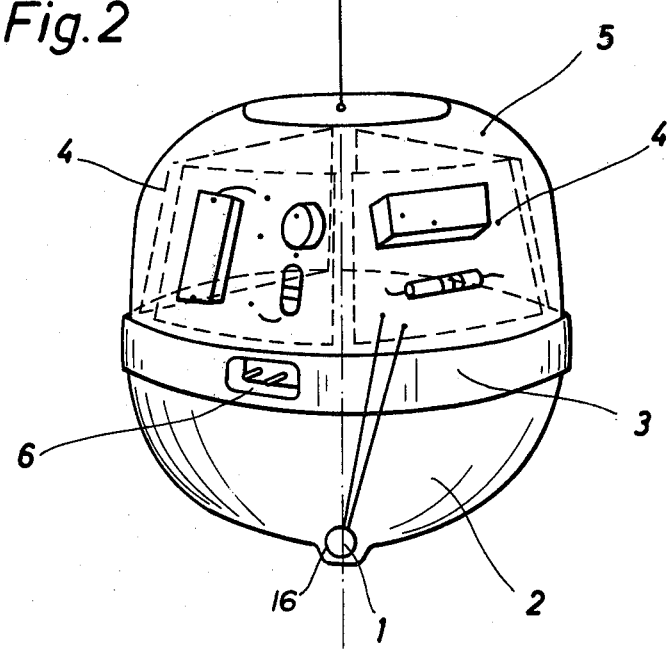

FIGS. 2 to 4 illustrate various embodiments of the feeler gauge according to the invention, constructed as a combined sensor-transmitter unit. The feeler gauge is adapted to sense the air temperature and the radiation temperature in combination in a manner analogous to the manner of the human body when it is subjected to the thermal comfort of a room. The feeler gauge comprises a thermal sensitive member 1, for sensing the air temperature, and a hemisphere 2 of thin-walled heat-conducting material with a black mat radiation absorbing surface for sensing the radiation temperature. The hemisphere 2 is at the top closed by an isolating plastic plate 3 carrying a protecting cap 5 and the transmitter of the feeler situated therebelow. The transmitter is constructed in the form of a printed circuit plate provided with electronic circuits 4.

The registered air and radiation temperatures influence heat-depending electronic components (e.g. PTC or NTC), the properties of which are changed along with the registered temperatures. Signals representing the changed properties are transmitted at regular intervals from the transmitter A to the receiver B or C. Here the signal representing the measured instantaneous value is compared with the programmed "desired comfort temperature" of the receiver. The "desired comfort temperature" here means the reference value, and subsequently the receiver emits signals to the valve or contact control means of the radiators for adjustment of the comfort temperature.

FIG. 5 shows a schematic illustration of an electrical circuit having components arranged in a manner to be used in this invention. In this circuit the thermal sensitive member 1 is an NTC resistor which forms part of a bridge circuit utilizing three additional resistors 10 of constant values. The bridge circuit is in parallel with an ocillator 12 which may be driven by a D.C. power source (not shown). The bridge is connected to transmitter 14, which is preferably an ultrasonic transmitter, as explained above, which transmits the signal to receiver B. The voltage across the bridge is a measure of the error signal transmitted by transmitter 14 which is used for controlling a heat supply value, or contact control means, so that the supply of heat is substantially proportional to the amplitude of the error signal.

The element 1 (NTC) is fastened to the lower central part of the hemisphere 2, as shown in FIG. 2, by a heat conductive adhesive 16 at the interface between these elements. Thereby the NTC resistor 1 is in thermal connection with the black mat radiation absorbing surface of hemisphere 2.

In use according to the invention the sensor by means of the built-in NTC resistor senses a temperature which partly depends on the room temperature, partly depends on the average temperature of the radiation, and partly depends on the rates of air flows in the room. The room temperature is sensed as a consequence of the NTC-resistor being arranged to be directly exposed in the room. The average temperature of the radiation is sensed as a consequence of the NTC-resistor being in thermal connection with the radiation absorbing surface of hemisphere 2. The temperature influencing the NTC-resistor will then be in the range between the two temperatures mentioned. In case of air flows in the room, however, the radiation absorbing surface will be cooled a little. By a suitable dimensioning the NTC-resistor will therefore measure a temperature which substantially corresponds to the comfort temperature. Thus, only one temperature dependent electrical component (the NTC resistor) is needed for measuring a temperature dependent as both the room temperature and the radiation temperature.

As illustrated in FIG. 3 the feeler gauge A may be provided with an indicator adjustment device 8, by means of which the comfort temperature may be adjusted, the transmitter being adjusted so as to emit signals in accordance with the desired room temperature. In this manner the receiver in the radiator system may be simplified, and a common adjustment may for instance be performed of several receivers located on their respective radiator.

The feeler gauge illustrated in FIG. 2 is actuated by a battery and provided with a plug 6 for recharging of the battery. The entire hemispherical feeler gauge may be easily replaced by another feeler gauge when it is to be recharged.

FIG. 4 illustrates a feeler gauge which may be constructed in a similar manner as the aforesaid two feeler gauges, but the transmitter of this feeler gauge is adapted to be actuated by energy from a solar cell 7.

It is to be understood that the combined feeler-transmitter A and the receiver B or C respectively may be varied in many ways without deviating from the scope of the invention.

I claim:

1. A temperature regulating system for controlling the temperature in a room comprising a feeler gauge adapted to control the supply of energy to a radiator system in the room, said gauge being adapted to be suspended in a room and comprising a radiation sensor and a convection sensor for sensing the radiation and air temperature respectively, and a wireless transmitter means, said convection sensor being operatively connected to said transmitter means to control the transmitter means to emit signals depending on the radiation and air temperature sensed at regular intervals, and a receiver controlling means for receiving said signals and regulating the supply of energy to the radiator system, said convection sensor comprising a thermal sensitive member for sensing air temperature and having properties which change in response to temperature changes, said radiation sensor comprising a thin-walled hemisphere of good heat-conducting material having a black mat radiation absorbing surface connected in heat-conducting relationship with said convection sensor, said transmitter means comprising a printed circuit including said convection sensor therein so that signals representing said changed properties are transmitted by said transmitter means to said receiver, programming means in said receiver whereby the desired temperature can be programmed in the receiver, and means to compare said signals with said desired temperature.

2. A temperature regulating system as claimed in claim 1 wherein said convection sensor comprises a temperature dependent electronic component as the variable element in a bridge circuit, said transmitter means is connected in said bridge circuit to be excited by the variations thereof produced by said temperature dependent electronic component.

3. A temperature regulating system as claimed in claim 2 wherein said temperature dependent electronic component is an NTC resistor, the bridge circuit includes other components comprising resistors of constant value, said transmitter means comprises an ultrasonic transmitter, and said receiver comprises an ultrasonic receiver.

4. A temperature regulating system as claimed in claim 3 wherein said feeler gauge is in the form of a hollow globular member with said thin-walled hemisphere forming the lower part thereof, and said convection sensor is located at the lower central position on the outer surface of said hemisphere.

* * * * *